Sept. 1, 1936.  R. J. GITS  2,052,762
OIL SEAL
Filed Dec. 14, 1935
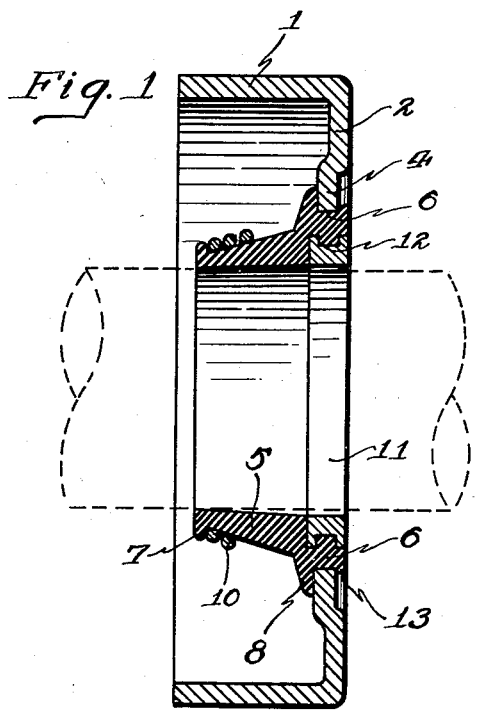
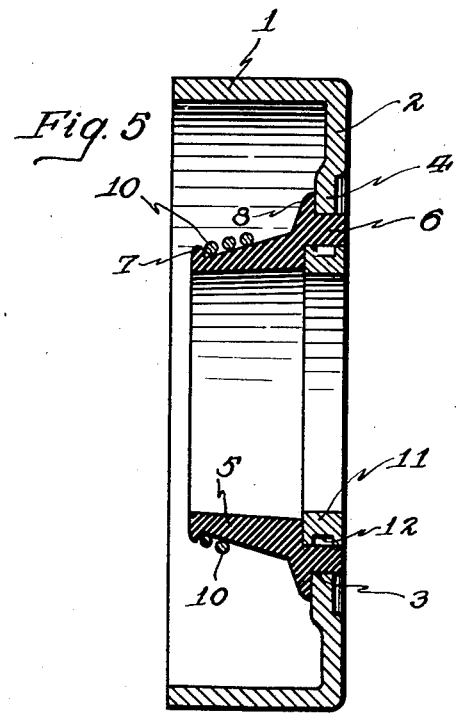
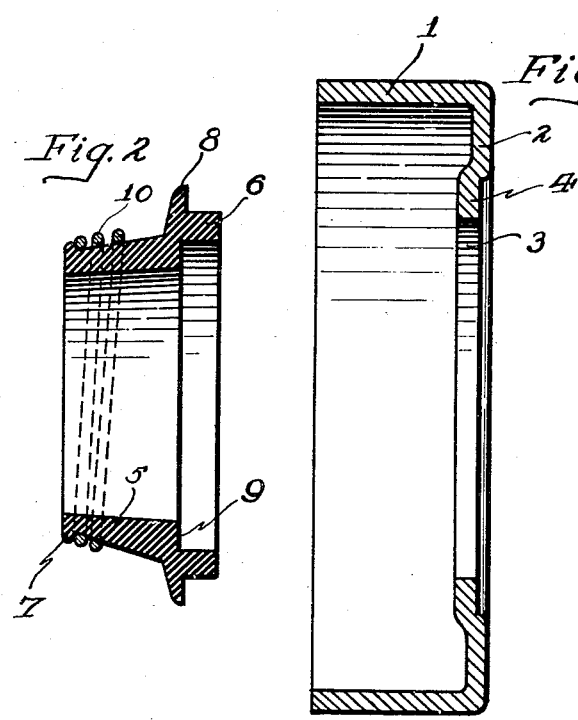
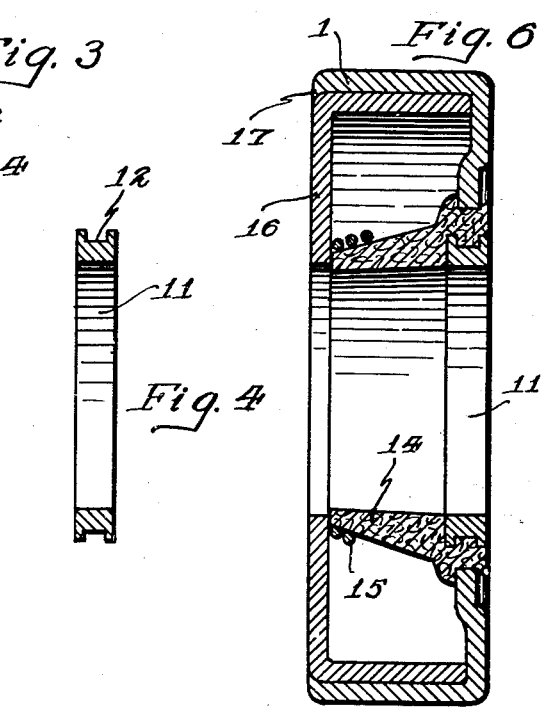
Inventor
Remi J. Gits Patented Sept. 1, 1936

2,052,762

UNITED STATES PATENT OFFICE 2,052,762

OIL SEAL

Remi J. Gits, Riverside, Ill.

Application December 14, 1935, Serial No. 54,385

7 Claims. (Cl. 288—1)

This invention relates to improvements in oil seals of the capsule type adapted for pressed-fit insertion into a housing in encompassing relation to a shaft passing therethrough and particularly to such seals designed for sealing reciprocating shafts of small diameters such as the shafts of shock absorbers and the like.

The main objects of this invention are to provide an improved capsule type oil seal adapted for construction in small sizes; to provide such a seal of simplified construction having a minimum number of parts; to provide such an oil seal having a moulded sleeve-like packing member that may be precisely formed to fit shafts of predetermined sizes and to efficiently seal the same with a minimum of contacting pressure; and to provide an improved capsule type oil seal that may be manufactured at a greatly reduced cost.

A specific embodiment of this invention is shown in the accompanying drawing, wherein:

Figure 1 is a sectional view showing the improved oil seal and its component parts.

Fig. 2 is a sectional view showing the packing or sealing member and its improved formation.

Fig. 3 is a sectional view showing the oil seal housing in which the packing member is mounted.

Fig. 4 is a sectional view illustrating an improved clamping ring by means of which the packing is secured in the housing.

Fig. 5 is a sectional view of the oil seal showing the parts in assembled relation, but prior to the expanding operation on the clamping ring whereby the packing member is secured to the housing, and Fig. 6 is a sectional view of a modified form of the improved oil seal that may be employed when a leather packing member is used.

In the forms shown in the drawing, the improved oil seal comprises a cup-shaped cylindrical shell having an inwardly extending flange at one end, the margin of which defines an annular aperture in which an axially extending sleeve-like packing member is inserted and clamped by means of an expanded clamping ring arranged to clamp one end of the packing member against the edge of the inwardly extending flange.

The packing member is preferably moulded from a suitable flexible material, such as synthetic rubber or the like, and is formed with integral external peripheral shoulders, one of which engages the flange of the housing to help secure the packing member to the housing and the other of which serves as a retaining means for a contractible spring surrounding the shaft engaging portion of the packing.

As shown in the drawing, the improved seal housing or shell 1 is formed with an integral inwardly extending flange 2 at one end and the inner margin of the flange 2, which is annular and defines an annular aperture 3, is offset inwardly as at 4, the flange 2 and the offset portion 4 extending in a generally radial direction and at right angles to the side wall of the shell or housing 1.

The sealing or packing member, as shown in Fig. 2, is a sleeve-like axially extending annular member having a shaft-engaging portion 5 and a radially offset clamping portion 6 which is of greater diameter than the shaft-engaging portion 5.

The end of the shaft-engaging portion 5 is formed to substantially fit the shaft which it is intended to seal and is tapered inwardly toward the shaft from the clamping portion. A peripheral external rib or shoulder 7 is provided at the end of the shaft-engaging portion.

An external peripheral shoulder 8 is provided adjacent the end of the clamping portion of the packing member and an annular counterbore or seat 9 is formed in that end because of the offset arrangement of the clamping portion 6.

A contractibly coiled helical spring 10 is positioned over the shaft-engaging portion of the packing member to contract the same about a shaft passing therethrough and is retained on the packing member by means of the rib or shoulder 7.

The sleeve-like packing member, shown in Fig. 2, is preferably moulded to a precise shape to fit a shaft of predetermined size and is so arranged that suitable contact is had with the shaft at the end of the shaft-engaging portion of the packing member with a minimum amount of taper to the inner surface of the shaft-engaging portion.

The packing member is preferably moulded of a flexible substance having superior wearing qualities and which will not be affected or deteriorated by oil or grease. The substance known as Koroseal, manufactured by the Goodrich Rubber Company, is found to have suitable properties for this purpose and to give excellent results.

A clamping member comprising an annular ductile ring 11 is utilized to secure the packing member to the flange of the shell or housing 1. The ring 11 is formed to be received and seated in the counterbore 9 formed by offsetting the clamping portion 6 of the packing member and is provided with a centrally located annular groove 12 in its outer periphery.

The improved oil seal is assembled by placing the packing member within the housing 1 with the clamping portion 6 extending through the aperture 3 and with the shoulder 8 engaging the inner face of the offset margin 4 of the flange 2, the shaft-engaging portion 5 being entirely housed within the shell 1, and the clamping ring 11 is then inserted in the end of the clamping portion of the packing member, so that the assembled parts assume the relationship shown in Fig. 5 of the drawing.

The clamping ring 11 is then swedged or rolled, or otherwise suitably expanded outwardly, so as to embed itself in the clamping portion 6 of the packing member and securely clamp the same against the edge of the offset portion 4 of the flange 2.

As shown in Figures 1 and 5 the clamping ring 11 is positioned so as to be diametrically alined with, or concentric with, the edge of the offset portion 4 of the shell flange, and the peripheral groove 12 is formed to have a width substantially equal to the thickness of the offset portion 4.

Thus, when the clamping ring is expanded to secure the packing member to the shell flange, the clamping portion 6 of the packing member is forced into the groove 12 and at the same time that portion of the packing member that extends beyond or outside of the shell flange is extruded over the edge thereof so as to overlap its margin as at 13 in Fig. 1. In this way the packing member is secured to the shell flange in such a manner that it is immovable relative thereto in either axial direction.

As shown in Figs. 1 and 5, the offset portion 4 of the flange 2 is disposed inwardly relative to the end of the shell a sufficient distance so that the outer end of the clamping portion 6 and the outer face of the clamping ring 11 will be flush with the end face of the shell 1. Thus, when the seal is inserted in a housing it may flatly abut the inner end of the housing or any other means that might come into engagement with the seal when it is in operative position.

A modified form of the improved seal is shown in Fig. 6 of the drawing, this form being particularly suitable for seals in which a packing made of leather is employed. The modified seal shown in Fig. 6 comprises all of the features embodied in the device shown in Fig. 1 with the exception of the peripheral rib or shoulder at the end of the shaft-engaging portion 14 of the packing member, it not being practical to form a leather packing member with such a rib.

As shown in Fig. 6, the helically coiled contractible spring 15 is held on the shaft-engaging portion 14 of the packing member by inwardly extending flange 16 of a cup-shaped member nested within the shell 1 and secured by rolling inwardly the marginal edge of the shell as at 17.

The main advantages of my improved oil seal lie in the fact that, due to the simplified construction and arrangement, the device can be made in smaller sizes than would be practical for other types of seals for sealing small reciprocal shafts with annularly contracted flexible sleeve-like packing members; this type of packing member being known to be more efficient than other types because of its suitability to provide a relatively narrow contacting area between the packing member and the shaft whereby an oil film forming on the shaft can be effectively broken down to prevent its passage through the seal.

Another advantage is in the fact that in the present construction a moulded packing member may be employed, which packing member can be formed to fit the shaft for which it is designed more closely than other types of packing members and to permit a relatively small amount of taper for the inner surface of the shaft-engaging portion so as to reduce the lateral space required for the clamping and securing arrangement without the probability of increasing the contacting area between the packing member and the shaft.

Another advantage of my improved oil seal construction is in its inherent simplicity which permits its manufacture at a much lower cost than other new types of oil seals.

Although but two specific embodiments of this invention are herein shown and described, it is to be understood that details of the construction shown may be altered or omitted without departing from the spirit of the invention as defined by the following claims.

I claim:

1. As an article of manufacture, a self-contained oil seal comprising a cylindrical shell having an inwardly projecting flange at one end, said flange having an annular inner margin, an axially extending sleeve-like packing member having an annular external shoulder adjacent one end and disposed within said shell with said one end extending through the opening defined by the margin of said flange and said shoulder abutting the inner face thereof, and an annular clamping ring disposed within said one end of said packing member and expanded radially to clamp the same against the edge of said flange.

2. As an article of manufacture, a self-contained oil seal comprising a cylindrical shell having an inwardly projecting flange at one end, said flange having its inner margin offset inwardly from the end of said shell and defining an annular aperture, an axially sleeve-like packing member having an annular external shoulder adjacent one end and disposed within said shell with said one end extending through the opening defined by the margin of said flange and said shoulder abutting the inner face thereof, and an annular clamping ring disposed within said one end of said packing member and expanded radially to clamp the same against the edge of said flange.

3. As an article of manufacture, a self-contained oil seal comprising a cylindrical shell having an inwardly projecting flange at one end, said flange having its inner margin offset inwardly from the end of said shell and defining an annular aperture, an axially sleeve-like packing member having an annular external shoulder adjacent one end and disposed within said shell with said one end extending through the opening defined by the margin of said flange and said shoulder abutting the inner face thereof, and an annular clamping ring disposed within said one end of said packing member and expanded radially to clamp the same against the edge of said flange, the said one end of said packing member and the outer face of said clamping ring being substantially flush with the adjacent end of said shell.

4. As an article of manufacture, a self-contained oil seal comprising a cylindrical shell having an inwardly projecting flange at one end, said flange having an annular inner margin, an axially extending sleeve-like packing member having an annular external shoulder adjacent one end and disposed within said shell with said one end extending through the opening defined by the margin of said flange and said shoulder abutting the inner face thereof, an annular clamping ring disposed within said one end of said packing member and expanded radially to clamp the same against the edge of said flange, an annular external shoulder at the other end of said packing member, and a wire spring contractibly coiled helically about said other end of said packing member and retained thereon by the last-named shoulder.

5. As an article of manufacture, a self-contained oil seal comprising a cylindrical shell having an inwardly projecting flange at one end, said flange having an annular inner margin, an axially extending sleeve-like packing member having an annular external shoulder adjacent one end and disposed within said shell with said one end extending through the opening defined by the margin of said flange and said shoulder abutting the inner face thereof, and an annular clamping ring disposed within said one end of said packing member and expanded radially to clamp the same against the edge of said flange, said clamping ring having an annular peripheral groove of substantially the same width as the thickness of said flange, and said groove being positioned in radial alinement with the edge of said flange.

6. As an article of manufacture, a self-contained oil seal arranged for pressed fit insertion into a housing in encompassing relation to a shaft passing therethrough, comprising a cylindrical shell having an inwardly projecting flange at one end, said flange having its inner margin offset inwardly from the end of said shell and defining an annular aperture, an axially extending sleeve-like packing member having an annular external shoulder adjacent one end and disposed within said shell with said one end extending through said annular aperture and said shoulder abutting the inner face of said flange, an annular clamping ring disposed within said one end of said packing member and expanded radially to clamp the same against the edge of said flange, said clamping ring being seated in a counterbore in the end of said packing member and having an annular peripheral groove of substantially the same width as the thickness of said flange, said groove being positioned in radial alinement with the edge of said flange, spring means contractibly coiled about the other end of said packing member, and means to retain said spring means on said packing member.

7. As an article of manufacture, a self-contained oil seal comprising a cylindrical shell having an inwardly projecting flange at one end, said flange having an annular inner margin, a moulded sleeve-like packing member of suitable flexible material disposed within said shell, said packing member being formed with an axially extending shaft engaging portion tapered inwardly toward one end and an axially extending clamping portion at the other end of greater diameter than the shaft-engaging portion, said packing member having an external peripheral shoulder formed thereon adjacent the said clamping portion and a peripheral external rib formed thereon at the other end, said clamping portion extending through the opening defined by the annular inner margin of said flange and said shoulder abutting the inner face thereof, an annular clamping ring disposed within the clamping portion of said packing member concentrically with the inner margin of said flange and expanded radially to clamp said packing against the edge of said flange, and a wire spring contractibly coiled helically about the shaft engaging end of said packing member and retained thereon by said peripheral rib.

REMI J. GITS.